United States Patent [19]

Ito

[11] Patent Number: 5,055,189

[45] Date of Patent: Oct. 8, 1991

[54] APPARATUS FOR WATER TREATMENT USING A MAGNETIC FIELD AND FAR INFRARED RAYS

[76] Inventor: Masashi Ito, 4-5-51, Hoshigauraodori, Kushiro, Hokkaido, Japan

[21] Appl. No.: 578,543

[22] Filed: Sep. 4, 1990

Related U.S. Application Data

[63] Continuation-in-part of Ser. No. 314,184, Feb. 22, 1989, abandoned.

[30] Foreign Application Priority Data

Nov. 10, 1988 [JP] Japan ............................ 63-282396

[51] Int. Cl.$^5$ ........................... B01D 1/30; B01D 1/48
[52] U.S. Cl. .................................. 210/222; 210/243; 250/432 R; 250/435
[58] Field of Search ............... 210/222, 223, 243, 695; 250/432 R, 434, 435; 422/22

[56] References Cited

U.S. PATENT DOCUMENTS 3,659,096  4/1972  Kompanek ........................... 422/22
4,067,810  1/1978  Sullivan ............................... 210/223
4,230,947  10/1980  Cram ................................... 250/434
4,327,276  4/1982  Injushin et al. .................. 250/432 R
4,396,580  8/1983  Patrick et al. ....................... 250/435
4,501,661  2/1985  Karasawa ............................ 210/695
4,601,822  7/1986  Zamburro .......................... 210/223
4,711,271  12/1987  Weisenbarger .................... 210/222
4,766,878  8/1988  Maruko ......................... 126/116 R
4,834,870  5/1989  Osterburg et al. .................... 209/38
4,995,425  2/1991  Weisenbarger et al. ............ 137/827

FOREIGN PATENT DOCUMENTS 1266892  10/1989  Japan .................................. 422/22

Primary Examiner—Robert A. Dawson
Assistant Examiner—Matthew O. Savage
Attorney, Agent, or Firm—Eckert Seamans Cherin & Mellott

[57] ABSTRACT

An apparatus for water treatment wherein case halves containing permanent magnets of opposing polarity produce magnetic lines perpendicular to water flow in a magnetically permeable pipe in conjunction with far infrared radiating ceramics to irradiate the liquid with far infrared radiation.

6 Claims, 3 Drawing Sheets

5,055,189

APPARATUS FOR WATER TREATMENT USING A MAGNETIC FIELD AND FAR INFRARED RAYS

CROSS-REFERENCE TO RELATED APPLICATION

This is a Continuation-in-Part Application to patent application Ser. No. 314,184, filed Feb. 22, 1989, now abandoned.

BACKGROUND OF THE INVENTION

This invention relates to a simple apparatus for water treatment to remove and prevent red rust in a liquid such as water flowing though a pipe such as a water supply pipe and a water pipe to send water into an elevated tank and also to activate said liquid.

Conventionally, water pipes including water supply pipes spread throughout a building suffer from a heavy adhesion of red rust and scale accompanying the deterioration of water, which adhesion helps corrosion of the pipes. As the factors of this, red rust, scale, and slime are known. As means to prevent them an apparatus for treating flowable material described in U.S. Pat. No. 4,230,947 and a process and apparatus for treatment of process flows by radiant energy described in U.S. Pat. No. 4,396,580 are known. The former apparatus includes a spreading means disposed in a water pipe through a standing-up part, an irradiation zone disposed below the outlet of the spreading means, and an irradiation means opposed to this irradiation zone. The apparatus with the thus-disposed spreading means having the irradiation means on its outlet side has a problem that its installation and maintenance are complicated, because the apparatus itself becomes large-size. The latter apparatus is a means for efficacious use of beams of ionizing radiant energy in treating a process flow, which apparatus has an electron gun disposed so that each thin zone formed by opposite walls of a duct is irradiated with the electron beam. Such apparatus also has a problem of complication of its installation and maintenance because of i&:s large size.

SUMMARY OF THE INVENTION

Accordingly, it is an object of this invention to provide a simple apparatus for water treatment which can be easily installed in a pipe and which is easy to maintain by solving the problems described above.

This invention comprises disposing N-polar permanent magnets in one of halved cases put as one body on a pipe having a magnetic permeability through which water such as water for drinking, hot-water supplier and food processing flows, and S-polar permanent magnets in the other case, thereby producing magnetic lines crossing perpendicularly to the direction of the water flow, and further disposing ceramics for far infrared radiation in the halved cases to irradiate the liquid with far infrared rays. When water is passed through a magnetic field formed between the bipolar magnetic fields of the N- and S-polar permanent magnets in the direction crossing thereto, the water molecule is excited by the magnetic field effect to obtain an increased energy level, which accelerates the deposition of dissolved ions, iron content, and precipitates and colloids having charges responsible for scale in the water to prevent adhesion of red rust, scale and slime on the inner wall of the pipe. When an oxygen having a high electronegativity and hydrogens bonding therewith are present as in water, a hydrogen bonding occurs to bind the water molecules which act like one molecule, but such water can be activated by irradiating with far infrared rays from the far infrared radiation ceramics to produce a resonance effect on vibration of molecular motion of the water molecules. This allows a semi-permanent use of the apparatus without treating with chemical agents and also a minimization of the space for its installation.

DESCRIPTION OF PREFERRED EMBODIMENTS

Figure 1:
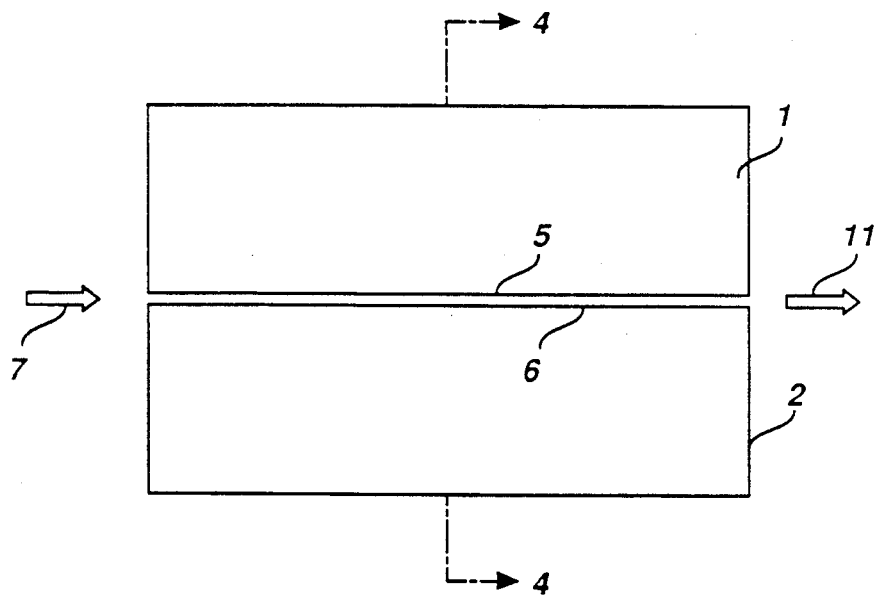
FIG. 1 is a front view of a preferred embodiment of this invention.

In FIGS. 1 to 6 illustrating a preferred embodiment of this invention, in a pipe formed of a material permeable to magnetic lines, water, such as drinking water or water for a hot-water supplier, food processing, hydroponic culture, seedling culture, feeding of cattle and cultivation, is flowing. The pipe may be formed from steel, copper, synthetic resins (PVC), or the like. Alternatively, or in addition thereto, the pipes may be permeable to FAR infrared radiation.

The said pipe is surrounded by a pair of diametrically positioned halved barrel cases 1 and 2 which are put on the pipe in a proper position thereof. The pair of cases and 2 have hollow chambers 3 and 4, respectively, and the end surface 5 of one case 1 and the end surface 6 of the other case 2 are formed flatly so as to adhere each other closely. The one end surface 5 has a projected claw piece (not shown) and the other end surface 6 a receiving orifice (not shown), and by inserting the claw piece into the receiving orifice, the pair of cases 1 and 2 are fixedly put on the pipe. Each of the cases 1and 2 is formed of a material which is permeable to magnetism. Alternatively, the cases may also be permeable to FAR infrared radiation.

Figure 4:
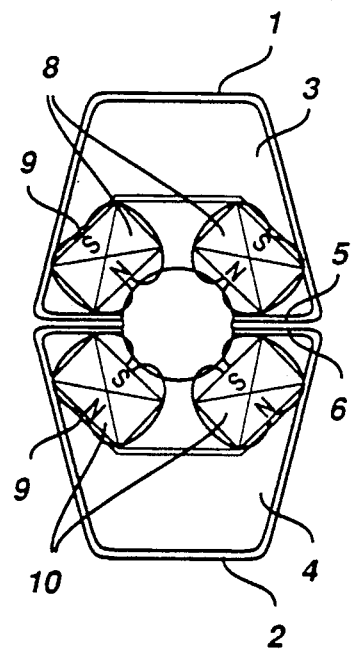
FIG. 4 is a cross-sectional view along section lines B—B of FIG. 2.

On the inlet side 7 of the chamber 3 of the case 1, a pair of N-polar permanent magnets 8 are fixed on both sides of the case having N-poles facing the pipe. These permanent magnets 8 of the same pole are independently disposed therein so as not to move by the repellent magnetic force. The N-polar and S-polar permanent magnets 8 have an iron backplate called a yoke 9 on the outer poles thereof. By this backplate 9, the effective gauss of the permanent magnets 8 can be increased by about 10% Inside the chamber 4 of the other case 2, S-polar permanent magnets 10 are fixed on both sides of the case having S-poles facing the pipe and N-poles of the N-polar permanent magnets 8. Namely, the permanent magnets 8 and 10 are disposed so that the magnetic lines extend at right angle to the pipe and the direction of the water flow as shown in FIG. 4. As the permanent magnets 8 and 10, ceramics of about 1500 G, ferrite magnet, samarium magnet consisting of an alloy of cobalt and samarium of rare earth elements, neodymium magnet mainly consisting of an alloy of iron, neodymium and boron may be used. Particularly, neodymium magnet is the most preferred permanent magnet because of its residual magnetic flux density 12.4 kG, retentivity 11.8 kOe, and maximum energy volume 37.0 kG.

Furthermore, on the outlet side 11 of the chambers 3 and 4 of the pair of cases 1 and 2, ceramics for far infrared radiation 12 and 13 are fixed opposite to the pipe. The far infrared radiation ceramics 12 and 13 are operatively connected to an external energy source, such as an electric power supply (not shown). Under the energy input from the electric power supply, the ceramics 12 and 13 emit far infrared radiation through a process well known in the art.

Figure 5:
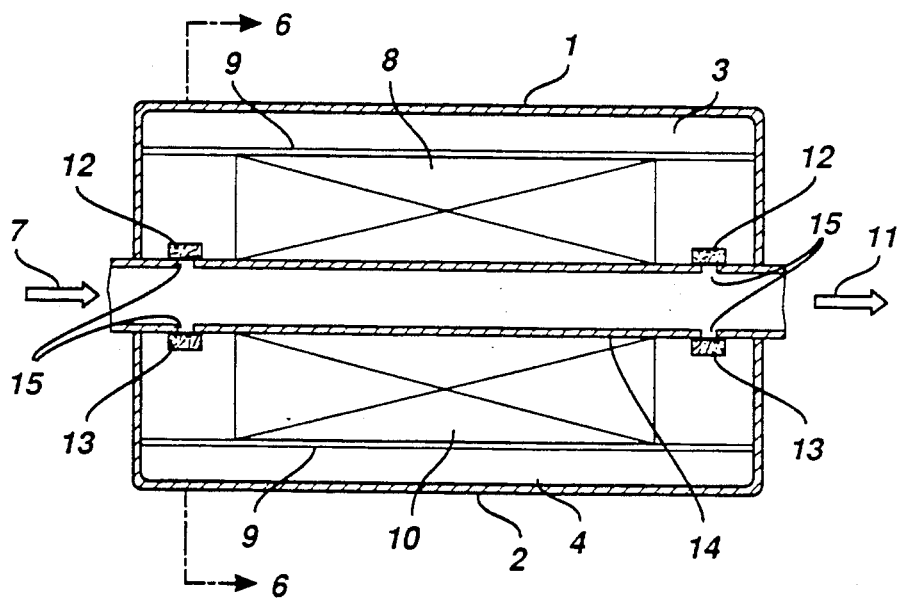
FIG. 5 is a cross-sectional view along section lines A—A of FIG. 1, showing disposition of a water pipe providing apertures adjacent the FAR infrared radiation ceramics.
Figure 6:
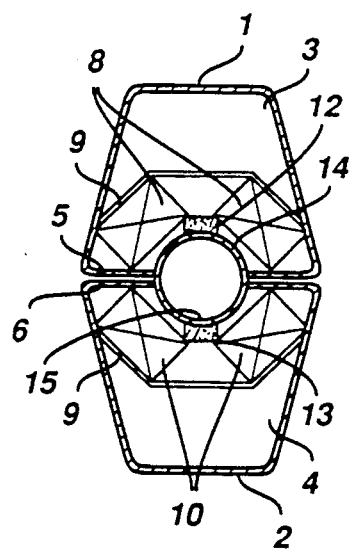
FIG. 6 is a cross-sectional view along section lines C—C of FIG. 5.

Referring to FIGS. 5 and 6, the pipe provides apertures 15 adjacent to the ceramics 12 and 13. The end surfaces 5 and 6 of the case halves 1 and 2 also provide apertures 15 which align with the pipe apertures 15. Through these apertures 15, far infrared radiation produced by the ceramics 12 and 13 is radiated into the water flowing in the pipe. To prevent water leakage through the apertures 15, the ceramics 12 and 13 may be sealingly connected to the end surfaces 5 and 6 to form seals around the apertures 15.

The far infrared radiation ceramics may be burned body with blackened surfaces (Commercial name: BIOCERAMICA), which have the following components.

| | | |
|---|---|---|
| $SiO_2$ | 70-80% | preferably 76% |
| $Al_2O_3$ | 10-20% | preferably 16% |
| $Fe_2O_3$ | 3-9% | preferably 6% |
| $ZrO_2$ | 5% or less | preferably 2% |

Also, these far infrared radiation ceramics 12 and 13 may be received in supplementary case packings (not shown), if necessary.

Accordingly, when water is passed through the pipe, the magnetic lines are crossed in the direction of the water flow, namely, the treated water crossing perpendicularly to the magnetic field between two poles is excited by a magnetic induction phenomenon based on the physical characteristics in magnetic hydromechanics to increase the energy level. At a result, the deposition of dissolved ions, iron contents, and precipitates and colloids having charges responsible for scale in the water is accelerated to prevent adhesion of red rust, scale, slime on the inner wall of the pipe.

Further, by irradiation of the water running through the pipe with far infrared rays with a wave length of 8 um-14 um radiated from the far infrared radiation ceramics 12 and 13, a resonance with the absorbed wave length of the water molecule occurs to decompose the hydrogen bond of the water molecule to activate the water, resulting in production of a treated water suitable to a living body. For example, when a water having 56000 general bacteria per ml is irradiated with far infrared rays from the far infrared radiation ceramics, as shown in the following table, the general bacteria can be reduced to the order of about 140 per ml, and in a test for E. coli group also, the above far infrared irradiation allows no detection of it.

| | Water treated with far infrared rays | |
|---|---|---|
| Item | Result | Standard value |
| Chlorine residue | 0.1 ppm | |
| pH value | 7.5 (20 C.) | 5.8–8.6 |
| Chlorine ion | 30.9 | 200 mg/l |
| CAL. MAG (Hardness) | 54.0 | 200 mg/l |
| Iron | less than 0.05 | 0.3 mg/l |

| | | E. Coli group | | | |
|---|---|---|---|---|---|
| Estimation | | | Complete test | | |
| test | | Definite | | gram- | |
| Amount of | | test | | negative | Re- |
| tested water | LB | BGLB | EBM | LB | Bacillus | sult |
| 50 ml | (−) | *** | ** | ** | *** | Not detected |

General bacteria 140/1 ml
Standard value: 100 or less in 1 ml

| | Untreated water | |
|---|---|---|
| Item | Result | Standard value |
| Chlorine residue | 0.1 ppm | |
| pH value | 7.6 (20 C.) | 5.8–8.6 |
| Chlorine ion | 16.5 | 200 mg/l |
| CAL. MGA (Hardness) | 47.0 | 200 mg/l |
| Iron | less than 0.05 | 0.3 mg/l |

| | | E. coli group | | | |
|---|---|---|---|---|---|
| Estimation | | | Complete test | | |
| test | | Definite | | gram- | |
| Amount of | | test | | negative | Re- |
| tested water | LB | BGLE | EBM | LB | Bacillus | sult |
| 50 ml | (+) | (+) | (+) | (+) | (+) | Not detected |

General bacteria 56,000/1 ml
Standard value: 100 or less in 1 ml

In this way, the activation of water by far infrared irradiation can be confirmed experimentally. The synergism with the magnetic field acts on spinning of electrons in the water molecule and a nuclear magnetic resonance phenomenon to raise the energy level from a steady state, forming an ultrafine granular condition.

The removal of red rust and scale can be illustrated as follows by using chemical equations.

It is a widely known scientific knowledge that the cause of corrosion of water and metals is mainly based on electrochemical reactions. Namely, iron is formed of iron ion ($Fe^{+2}$) and electrons (2e.), in which the transfer of electrons constantly occurs. The electrochemical reaction is shown by the transfer amount of these electrons. The base side releasing electrons is called an anode (+). This causes the corrosion, which can be shown by the following reaction formula.

$$Fe \rightarrow Fe^2 \text{ (eluted)} + 2e \text{ (transfer)} \tag{A}$$

The opposite base side receiving electrons is a cathode (−), which is an incorrodible side. If the electrons are released in water, the water is reacted with the dissolved oxygen to produce hydrogen ions as shown by the following reaction formula.

$$H_2O + 1/2O_2 + 2e \text{ (released electrons)} \rightarrow 2OH \tag{B}$$

The initial development of rust of iron is as follows.

$$Fe^2 + 2OH \rightarrow Fe(OH)_2 \tag{C}$$

Further, it is reacted with water and oxygen to form ferric hydroxide.

$$4Fe(OH)_2 + O_2 + 2H_2O \rightarrow 4Fe(OH)_3 \tag{D}$$

The ferric hydroxide is adhered on the surface of iron as it forms an insoluble colloid. This is the basis of red rust, flowing out to form red rust water. The red rust is deteriorated into lump form by $FeO_3$.

In this way, the corrosion of the iron contacting with water is caused by the giving and receiving reaction of electrons on its interface, and the smaller this potential difference is, the more the reaction of $Fe \rightarrow Fe^{2-} + 2e$ is restricted. Recently, the development of corrosion by red rust tends to be increased because of an increase in input of chlorine agents. The water which has received magnetism and far infrared radiation was formed into fine grains by the electron excitation effect to obtain an increased energy level, thereby removing and peeling off the rust on the water pipe walls gradually for acceleration of the dissolution of red rust, and preventing readhesion thereof. Also, the purification of water is achieved by physical acts on the structural change of water such as adjustment of pH value to form ultrafine crystals, and the thus-purified water is also applicable to drinking water.

Accordingly, the system design having the permanent magnets 8 and 10 and the far infrared radiation ceramics 12 and 13 provides a condition in which the magnetized water is easy to receive heat radiation of far infrared rays much more than general water in the process to raise the energy level of the water by the magnetic field effect, by arranging the permanent magnets 8 and 10 on the inlet side and far infrared radiation ceramics 12 and 13 near the outlet side 11.

Accordingly, the water running from the inlet side to the outlet side of the pipe can be activated by first increasing the energy level of the water molecule by the above magnetic field, and then irradiating this water molecule having an increased energy level with far infrared rays to produce a resonance phenomenon.

The thus-treated water is not only free from rust and scale, but is also suitable to a living body.

Further, as the apparatus of this invention consists of a pair of cases 1 and 2, put on the pipe, having the above permanent magnets 8 and 10 and far infrared radiation ceramics 12 and 13 therein, it is easy to install without any special skill, and also the space for its installation can be minimized. As the technique of water treatment depends on the magnetic force of the permanent magnets 8 and 10 and the far infrared rays from the far infrared radiation ceramics 12 and 13, the apparatus of this invention can be operated with only sufficient energy input to the ceramics 12 and 13 to cause said ceramics 12 and 13 to produce far infrared radiation. Furthermore, the present invention can be installed in any place by simply providing apertures 15 in pipes, such as water supply pipes.

The improvement in quality of water by the multiple effect of magnetism and far infrared radiation materials requires no chemical agents as it is not by a chemical treatment process and reduced energy operating cost as it is not by an electronic field treatment process, and by the conversion effect of the electron-exciting energy caused by magnetic waves and far infrared rays, the water molecule is made into fine grains, which contact with the inner pipe wall having red rust adhered thereon to proceed its dissolution. Thus, the solid lump rust and scale are progressively changed to soft materials and, after a long time application, removed and peeled off. After their removal, the pipe wall surface is changed to iron black, exhibiting an effect as a new technical process of the physical theory to prevent their readhesion.

The treated water is free from the fear of damage from chemical agents as drinking water because of no use of rust preventives such as chemical agents, and also the economical burdens such as continuous input of the agents as in the case of using chemical agents are reduced to zero.

The apparatus of this invention does not depend on a technique to form an electromagnetic field by electricity as electromagnetic field process, but uses semi-permanent materials, ceramics, for the permanent magnets 8 and 10 and far infrared radiation ceramics 12 and 13 used in the heart part, so that the maintenance and production management after its installation are less than is required for other systems.

The possibilities of its installation on both primary and secondary sides of a waterway system and the control of water by only physical means enable an exhibition of the effect in any water pipe route, contributing to a wide ranging use.

The examples include removal of red rust, scale and slime in all routes of water supply pipes in a building and prevention of readhesion thereof, banishment of deteriorated pipes and security of long life of pipes by this effect, and in its return, prevention of damage of the building by breakage of the water supply pipes and leakage of water.

This invention is never limited by the above embodiment. For example, the number of permanent magnets is varied according to the amount of the treated water, and in the experimental values, one far infrared radiation ceramics is desired when 3 magnets are required on one side, and two for a flow rate requiring 6 magnets. Thus, as shown in the following table, when the diameter of the pipe is 15 mm and the flow rate is 2 m/sec, far infrared radiation ceramics are used for 6 permanent magnets.

| Diameter of pipe (mm) | Flow Speed m/s | Number of permanent magnets | Number of far infrared radiation ceramics |
|---|---|---|---|
| 15 | 2 m/s | 6 (3 pairs) | 2 (1 pair) |
| 20 | " | 8 (4 pairs) | 4 (2 pairs) |
| 32 | " | 10 (5 pairs) | 6 (3 pairs) |
| 40 | " | 12 (6 pairs) | 8 (4 pairs) |
| 50 | " | 14 (7 pairs) | 10 (5 pairs) |

Further, various modifications are also possible such that the permanent magnets and far infrared radiation ceramics are mounted to the cases through packings. The far infrared radiation ceramics may be disposed in only one of the cases, and further it may be disposed on either of the inlet and outlet sides of the case. The pair of oases may be fixed by means of bolt and nut, rubber band, and the like.

What is claimed is:

1. An apparatus for treating water comprising:
    a pair of halved cases diametrically positioned about an outer surface of a pipe;
    N-polar permanent magnets disposed in one of said cases having N-poles inwardly facing the pipe;
    S-polar permanent magnets disposed in the other of said cases having S-poles inwardly facing the pipe; and
    ceramics for far infrared radiation disposed in at least one of said cases.

2. An apparatus according to claim 1, wherein the N-polar and S-polar permanent magnets face each other to form magnetic lines of flux that extend at right angles relative to said pipe.

3. An apparatus according to claims 1 or 2, wherein the permanent magnet is neodymium magnet.

4. An apparatus according to claims 1 or 2, wherein the permanent magnet is ferrite magnet.

5. An apparatus according to claims 1 or 2, wherein the permanent magnets are disposed adjacent an inlet side of the pipe and the ceramics for far infrared radiation are disposed adjacent an outlet side thereof.

6. An apparatus according to claims 1 or 2 further comprising an iron backplate disposed within each said halved case adjacent outwardly facing poles of the permanent magnets.

* * * * *

UNITED STATES PATENT AND TRADEMARK OFFICE
CERTIFICATE OF CORRECTION

PATENT NO. : 5,055,189
DATED : October 8, 1991
INVENTOR(S) : ITO

It is certified that error appears in the above-identified patent and that said Letters Patent is hereby corrected as shown below:

Column 1, line 41, replace "i&:s" with --its--.

Figure 2:
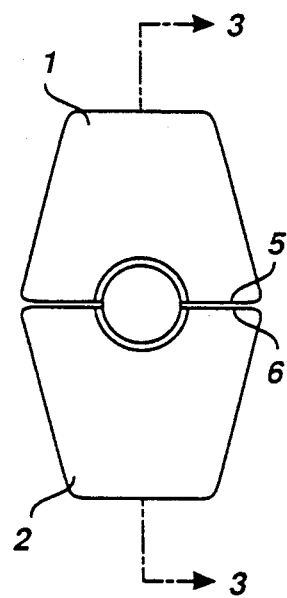
FIG. 2 is a side view thereof.
Figure 3:
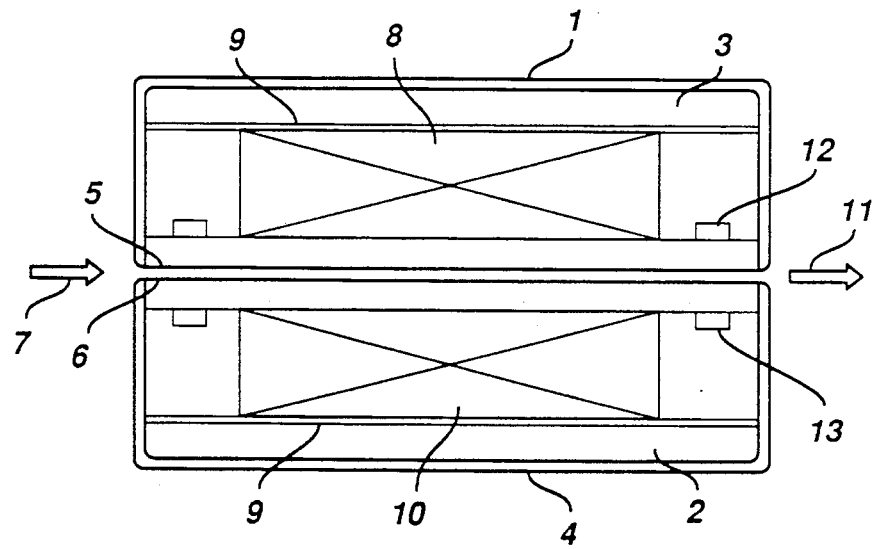
FIG. 3 is a cross sectional view along section lines A—A of FIG. 1.

Column 2, line 14, replace "A-A of FIG. 1;" with --3-3 of FIG. 2;--.

line 16, replace "B-B of FIG.2;" with --4-4 of FIG. 1;--.

lines 17-18, replace "along section lines A-A of FIG. 1," with --of the invention--.

line 22, replace "C-C" with --6-6--.

line 59, after "10%" insert a period (--.--).

Column 3, line 60, replace "as" with --also--.

Column 4, line 45, replace "(2e.)" with --($2e^-$)--.

line 51, replace "2e" with --$2e^-$--.

line 59, replace "2e" with --$2e^-$--.

line 59, replace "2OH" with --$2OH^-$--.

line 63, replace "2OH" with --$2OH^-$--.

Column 5, line 9, replace "$Fe^{2-}$" with --$Fe^{2+}$--.

line 9, replace "2e" with --$2e^-$--.

line 67, replace "their" with --this--.

UNITED STATES PATENT AND TRADEMARK OFFICE
CERTIFICATE OF CORRECTION

PATENT NO. : 5,055,189

DATED : October 8, 1991

INVENTOR(S) : Masashi Ito

It is certified that error appears in the above-identified patent and that said Letters Patent is hereby corrected as shown below:

Column 6, line 56, replace "oases" with --cases--.

Signed and Sealed this

Fifteenth Day of June, 1993

Attest:

MICHAEL K. KIRK

Attesting Officer

Acting Commissioner of Patents and Trademarks